US007003640B2

(12) United States Patent
Mayo et al.

(10) Patent No.: US 7,003,640 B2
(45) Date of Patent: Feb. 21, 2006

(54) POWER-AWARE ADAPTATION IN AN INFORMATION SERVER

(75) Inventors: Robert N. Mayo, Mountain View, CA (US); Parthasarathy Ranganathan, Palo Alto, CA (US); Robert J. Stets, Jr., Palo Alto, CA (US); Deborah A. Wallach, Emerald Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 406 days.

(21) Appl. No.: 10/629,032

(22) Filed: Jul. 28, 2003

(65) Prior Publication Data

US 2005/0027952 A1 Feb. 3, 2005

(51) Int. Cl.
*G06F 12/00* (2006.01)

(52) U.S. Cl. .......................... 711/158; 711/113; 711/5; 710/309; 718/103

(58) Field of Classification Search ............... 711/151, 711/158, 113, 5; 710/36, 109, 200, 269, 710/309; 718/103

See application file for complete search history.

(56) References Cited

U.S. PATENT DOCUMENTS 4,371,929 A * 2/1983 Brann et al. .................. 710/45
5,713,003 A * 1/1998 DeWitt et al. .............. 711/118
5,968,167 A * 10/1999 Whittaker et al. .......... 712/225
6,895,482 B1 * 5/2005 Blackmon et al. .......... 711/158

* cited by examiner

*Primary Examiner*—Nasser Moazzami
(74) *Attorney, Agent, or Firm*—Richard P. Lange

(57) ABSTRACT

An information server with power-aware adaptation that enables power reduction while minimizing the performance impact of power reduction. An information server according to the present techniques includes a transaction prioritizer that determines which of a set of memory subsystems in the information server is to cache a set of data associated with each incoming information access transaction and further includes a power manager that performs a power adaptation in the information server in response to a set of ranks assigned to the memory subsystems. An association of priorities of the incoming information access transactions to appropriately ranked memory subsystems and the judicious selection of memory subsystems for power adaptation enhances the likelihood that higher priority cached data is not lost during power adaptation.

26 Claims, 3 Drawing Sheets

POWER-AWARE ADAPTATION IN AN INFORMATION SERVER

BACKGROUND

A wide variety of information systems may employ information servers. Information servers may be used to provide access to data stored on the persistent storage devices. A data center, for example, usually includes a set of information servers that provide access to data that is persistently stored on a set of disk drives in the data center.

Typically, an information server services information access transactions that target data stored on persistent storage devices. Examples of information access transactions include SQL read/write/modify transactions.

A typical information server includes an internal memory that may be used as a cache for data obtained from persistent storage. The caching of data in an internal memory of an information server usually improves response time of the information server when handling information access transactions for which data held in the cache.

It is often desirable to reduce the power consumption of an information server. In a data center, for example, it may be desirable to the reduce power consumption of its information servers to reduce overall power consumption in the data center. In addition, it may be desirable to reduce the power consumption of the information servers to reduce heat in the data center environment. A reduction in heat in a data center may increase the reliability of hardware in the data center and may enable more density in data center hardware and may reduce costs associated with over-provisioning. It may also be desirable to reduce the power consumption in a manner that avoids a severe negative impact on the overall response time of an information server when servicing information access transactions.

SUMMARY OF THE INVENTION

An information server is disclosed with power-aware adaptation that enables power reduction while minimizing the performance impact of power reduction. An information server according to the present techniques includes a transaction prioritizer that determines which of a set of memory subsystems in the information server is to cache a set of data associated with each incoming information access transaction and further includes a power manager that performs a power adaptation in the information server in response to a set of ranks assigned to the memory subsystems. An association of priorities of the incoming information access transactions to appropriately ranked memory subsystems and the judicious selection of memory subsystems for power adaptation enhances the likelihood that higher priority cached data is not lost during power adaptation.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
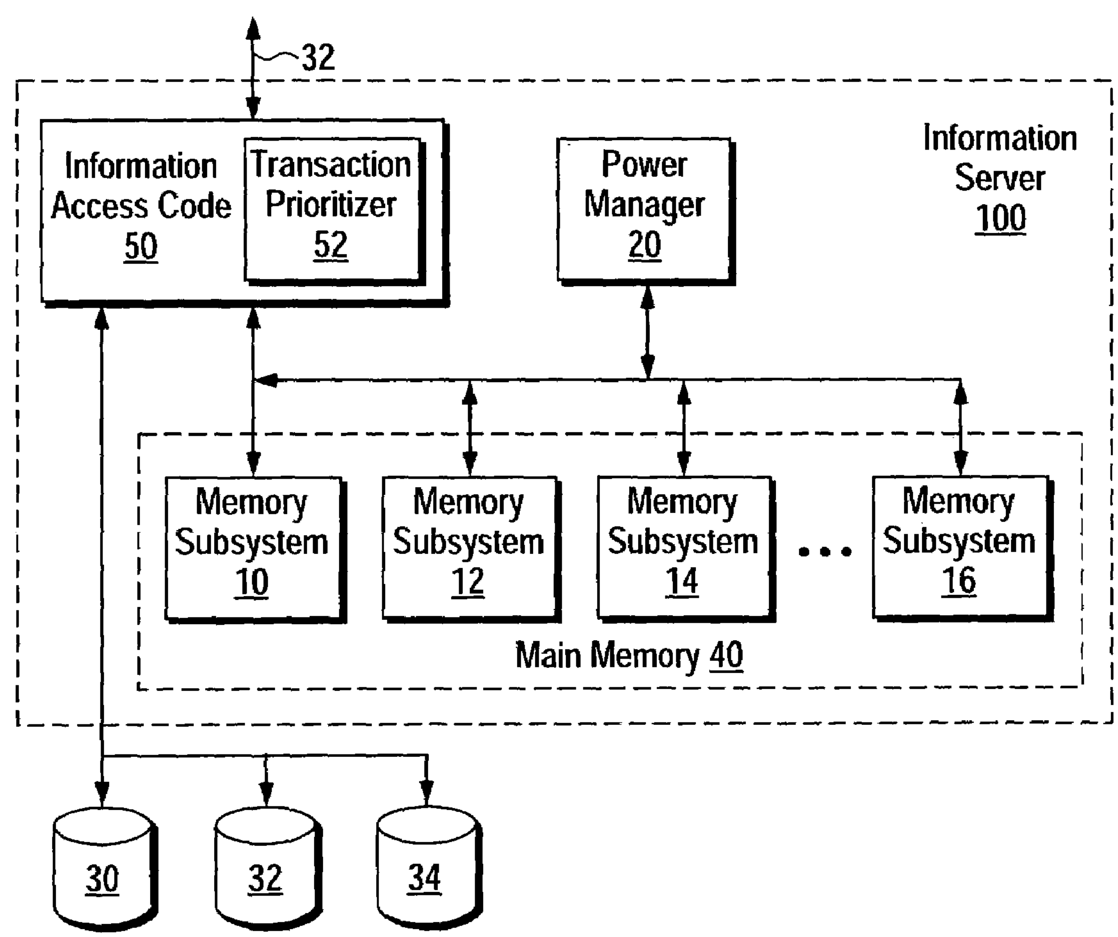
FIG. 1 shows an information server according to the present teachings.

FIG. 1 shows an information server 100 according to the present teachings. The information server 100 enables access to data that is stored in a set of persistent storage devices 30–34. The information server 100 includes a main memory 40, a set of information access code 50, and a power manager 20.

The information access code 50 obtains information access transactions via a communication path 32. The information access code 50 performs read/write accesses to the persistent storage devices 30–34 as needed to service the received information access transactions. A received information access transaction may specify a read, write, modify, etc., of data that is stored on the persistent storage devices 30–34. An information access transaction may take the form of an SQL transaction.

The information access code 50 uses the main memory 40 as a cache for data stored in the persistent storage devices 30–34. The caching of data in the main memory 40 enhances speed with which the information server 100 may respond to an information access transaction when the data targeted by the information access transaction is held in the main memory 40.

The main memory 40 is subdivided into a set of memory subsystems 10–16. The power status of each of the memory subsystems 10–16 is independently controllable by the power manager 20. For example, the power manager 20 may independently switch on/off each of the memory subsystems 10–16 or place each of the memory subsystems 10–16 in power reduction mode or remove each of the memory subsystems 10–16 from a power reduction mode. In one embodiment, the main memory 40 is comprised of random access memories that are arranged into banks wherein the power state of each bank is individually controllable.

The information access code 50 includes a transaction prioritizer 52 that examines each information access transaction received via the communication path 32. The transaction prioritizer 52 assigns a priority to each information access transaction. The priority assigned to an information access transaction determines which of the memory subsystems 10–16 of the main memory 40 is to be used to cache data associated with the information access transaction. The priority may be based on a service-level agreement between the provider of the information server 100 and the client that originates the information access transaction.

In addition, each of the memory subsystems 10–16 is assigned a rank for use in power adaptation in the information server 100. The memory subsystems 10–16 may be ranked in any manner. For example, if there are N of the memory subsystems 10–16 then the memory subsystem 10 may be assigned a rank=1 and the memory subsystem 12 a rank=2, etc., or visa versa. Any numbering system or rank indicators may be used. More than one of the memory subsystems 10–16 may be assigned the same rank and there may be any number of ranks assigned.

The power manager 20 monitors the power consumption of the information server 100 and/or environmental and/or other conditions associated with the information server 100 and performs power adaptation when appropriate. In one embodiment, the power adaptations by the power manager 20 are triggered automatically—for example through heuristics programmed into the power manager 20.

For example, an excessive amount of power consumption of the information server 100 or excessive heat in the environment of the information server 100 may cause the power manager 20 to perform power adaptation by switching off one or more of the memory subsystems 10–16 or by placing one or more of the memory subsystems 10–16 in a reduced power state. The power manager 20 may implement any method of tradeoff between power and performance when selecting a power adaptation mode for the subsystems 10–16. For example, a reduced power state may provide less power savings than a power off state but still provide the performance benefits of caching.

In another example, if the load of information access transactions received via the communication path 32 is relatively high then the power manager 20 may perform power adaptation by switching on one or more of the memory subsystems 10–16 that are in a power off state. Similarly, if the load of received information access transactions is relatively high then the power manager 20 may perform power adaptation by removing the power reduction state of one or more of the memory subsystems 10–16 that are in a reduced power state. The power manager 20 or some other element in the information server 100 may implement mechanisms for measuring response time to information access transactions so that an increase in response time may trigger power adaptation.

The above provide a few examples of conditions that my trigger power adaptation. A variety of conditions may cause the power manager 20 to trigger power adaptation.

In addition, the power adaptations in the information server 100 may be triggered manually—for example through the intervention of a system administrator. For example, the power manager 20 may generate one or more web pages that enable manual power control using web protocols via the communication path 32.

The power manager 20 selects the memory subsystems 10–16 to be powered down or to be placed in a power reduction state on the basis of their assigned rank. For example, the power manager 20 initially powers down the memory subsystem 10–16 having the lowest rank that is currently in a full power state and then powers down the memory subsystem 10–16 having the next lowest rank that is currently in a full power state, etc., as needed to accomplish the appropriate power adaptation.

In addition, the power manager 20 selects the memory subsystems 10–16 that are to be restored to a full power state on the basis of their assigned rank. For example, the power manager 20 initially restores to full power the memory subsystem 10–16 having the highest rank that is currently in an off state or a reduced power state and then powers up the memory subsystem 10–16 having the next highest rank that is currently in an off or reduced power state, etc., as needed to accomplish the appropriate power adaptation.

The power manager 20 may notify the information access code 50 of upcoming changes in the power status of the memory subsystems 10–16 so that the corresponding cached data may be handled accordingly. For example, any "dirty" data in the memory subsystems 10–16 may be written back to persistent storage.

The information access code 50 selects one of the active memory subsystems 10–16 to cache data for a received information access transaction based on the priority assigned to the received information access transaction by the transaction prioritizer 52 and the ranks of the memory subsystems 10–16. The information access code 50 selects one of the active memory subsystems 10–16 for caching data for an information access transaction by matching a priority of the information access transaction to the ranks of the memory subsystems 10–16. The memory subsystems 10–16 having a high rank are selected for the information access transactions having a high priority and the memory subsystems 10–16 having a low rank are selected for the information access transactions assigned a low priority.

The priorities assigned to the information access transactions may employ a system similar to the ranking of the memory subsystems 10–16. For example, if the memory subsystems 10–16 are ranked from 1 to N then a received information access transaction may be assigned a priority between 1 and N by the transaction prioritizer 52. In such an embodiment, an information access transaction having a priority=1 will be cached by the memory subsystem 10–16 having a rank=1 and an information access transaction having a priority=2 will be cached by the memory subsystem 10–16 having a rank=2, etc. Alternatively, any type of mapping between ranks of memory subsystems 10–16 and priorities of information access transactions may be used.

If a matching low ranking memory subsystem 10–16 is not active when a low priority information access transaction is received then the information access code 50 selects the lowest ranking active memory subsystem 10–16. In the example 1-N ranking and priorities, when the memory subsystem 10–16 having a rank=1 is not active an information access transaction having a priority=1 will be cached by the memory subsystem 10–16 having a rank=2 if it is active or by the memory subsystem 10–16 having a rank=3 if it is active, etc.

The priorities assigned to the incoming information access transactions may be derived using any method. The priority of an incoming information access transaction may be included in the information access transaction. The priority of an incoming information access transaction may be derived from information contained in the information access transaction.

For example, clients associated with an information access transaction may pay more money in exchange for a higher priority on their transactions. The priority may be derived from an identity of an originator of the information access transaction. An originator of an information access transaction may be identified in any manner—for example using an IP address.

In another example, the transaction prioritizer 52 may analyze and compute statistics on information access transactions and assign priorities accordingly.

In another example, the priority of an information access transaction may be based on the data targeted by the transaction so that some data in the persistent storage devices 30–34 is deemed higher priority than other data.

The present techniques may increase the likelihood that data for high priority information access transactions will be cached in active memory subsystems because the memory subsystems that handle lower priority transactions are powered down first. This minimizes the performance degradation that might otherwise occur if the memory subsystems 10–16 were to be powered down without regard to their rank, i.e. the priority of information access transactions whose data they cache.

Figure 2:
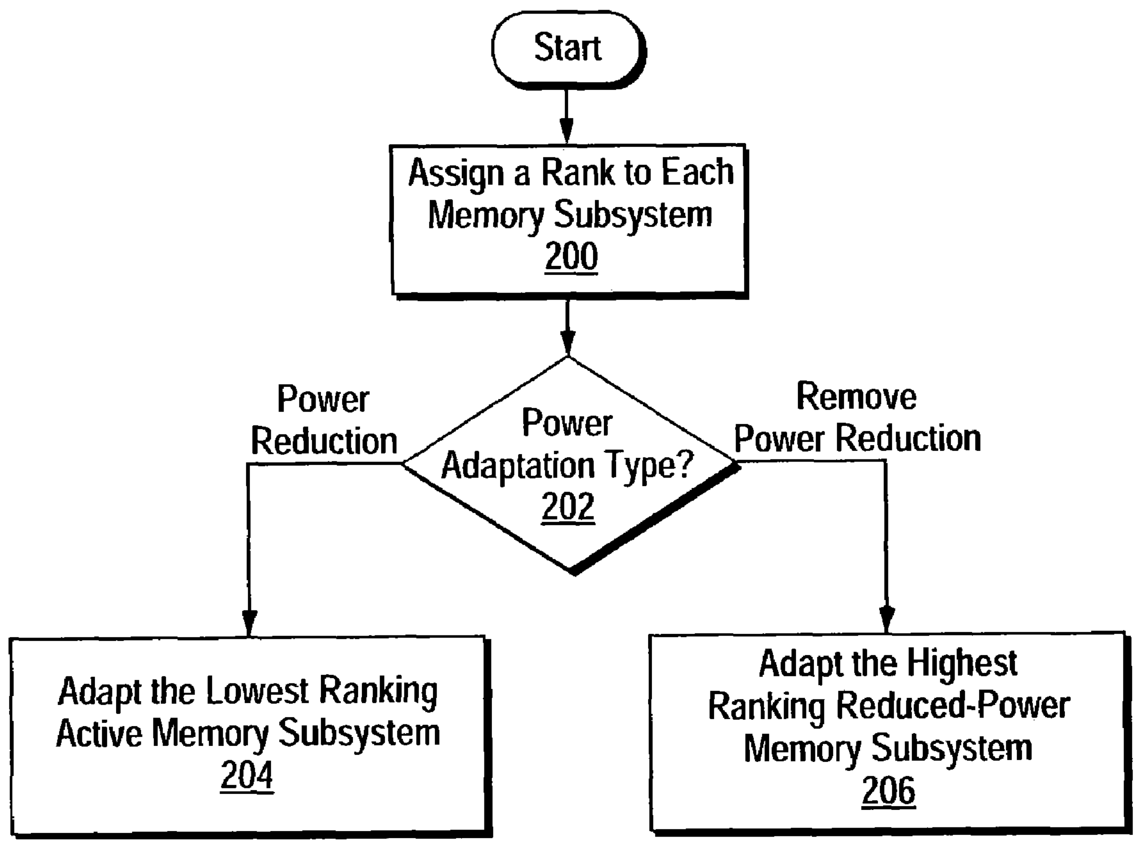
FIG. 2 shows a method for power-aware adaptation according to the present teachings.

FIG. 2 shows a method for power-aware adaptation according to the present teachings. At step 200, a rank is assigned to each of the memory subsystems 10–16. The following focuses on an example embodiment in which the memory subsystems 10–16 include a set of 4 nodes which are assigned the ranks 1 through 4, respectively, at step 200.

At decision step 202, if a power reduction type of power adaptation is triggered then step 204 is performed and if a removal of power reduction type is triggered then step 206 is performed. Power reduction may be triggered by an excessive power consumption in the information server 100 or excessive heat in the environment of the information server 100 or by a combination of these factors. Removal of power reduction may be triggered by a slow response time to information access transactions by the information server 100 or an increase in memory bandwidth contention or a reduction in environment heat or a combination of factors.

At step 204, the lowest ranking active memory subsystem 10–16 is adapted for reduced power consumption. The selected memory subsystem 10–16 may be adapted for reduced power consumption by powering it down, i.e. switching it off, or by using other methods of power control.

For example, if the memory subsystems 10–16 are all active then the memory subsystem 10 may be powered down at step 204. This results in the loss of cached data for the lowest priority information access transactions which is normally held in the lowest ranking memory subsystem 10. At step 204, if the memory subsystems 12–16 only are active then the memory subsystem 12 may be powered down resulting in the loss of its relatively low priority cached data.

At step 206, the highest ranking reduced-power, e.g. powered down, memory subsystem 10–16 is adapted to remove power reduction. A selected access node may be adapted to remove power reduction by powering it up, i.e. switching it on, or by using other methods of power control.

For example, if the memory subsystems 10 and 12 are inactive then the memory subsystem 12 may be powered up at step 206 because its rank is higher than the rank of the memory subsystem 10. This recreates the capacity to cache data in the memory subsystem 12.

Figure 3:
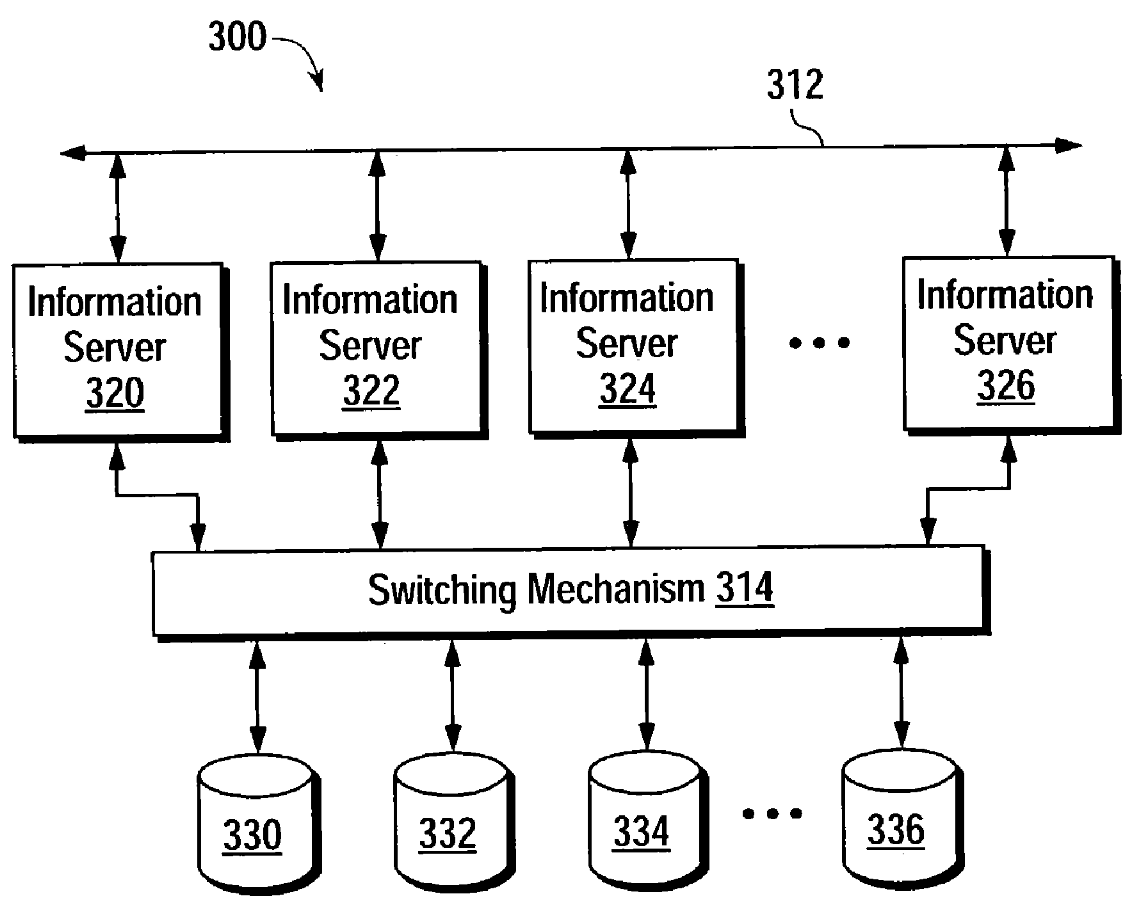
FIG. 3 shows a data center that incorporates the present teachings.

FIG. 3 shows a data center 300 that incorporates the present teachings. The data center 300 includes a set of storage devices 330–336, and a set of information servers 320–326 that provide access to data stored on the storage devices 320–326. The data center 300 includes a switching mechanism 314 that enables access to all of the storage devices 330–336 by all of the information servers 320-326.

The storage devices 330–336 provide large scale persistent storage of data for applications implemented in the data center 300. In a database application, for example, the storage devices 330–336 provide a persistent store for database tables and records, etc.

The information servers 320–326 obtain incoming information access transactions via an internal network 312. In a database application in the data center 300, for example, the information access transactions may be database reads, writes, queries, etc. The data center 300 may include a set of application servers and a set of web servers that generate the information access transactions in response to web client interactions via a network communication path to the data center 300.

The information servers 320–326 perform reads from and/or writes to the storage devices 330–336 via the switching mechanism 14 to access persistent data as needed when carrying out the information access transactions. Any one or more of the information servers 320–326 may perform the power adaptation methods disclosed above. The power adaptations in the information servers 320–326 may be triggered automatically or manually through the intervention of a system administrator.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An information server, comprising:

transaction prioritizer that determines which of a set of memory subsystems in the information server is to cache a set of data associated with an information access transaction;

power manager that performs a power adaptation in the information server in response to a set of ranks assigned to the memory subsystems.

2. The information server of claim 1, wherein the transaction prioritizer determines which of the memory subsystems is to cache the data by determining a priority of the information access transaction and matching the priority to the ranks.

3. The information server of claim 2, wherein the transaction prioritizer selects the memory subsystem having the rank that is a closest match to the priority.

4. The information server of claim 2, wherein the transaction prioritizer determines the priority by examining the information access transaction.

5. The information server of claim 4, wherein the priority is carried in the information access transaction which is obtained via a network.

6. The information server of claim 2, wherein the priority is determined by the data targeted by the information access transaction.

7. The information server of claim 1, wherein the priority is determined by agreement.

8. The information server of claim 1, wherein the power adaptation is triggered by a relatively high rate of power consumption.

9. The information server of claim 1, wherein the power adaptation is triggered by a relatively high level of heat.

10. The information server of claim 1, wherein the power adaptation is triggered by a relatively slow response time.

11. The information server of claim 1, wherein the power adaptation is triggered by a change in memory bandwidth contention.

12. The information server of claim 1, wherein the power manager performs the power adaptation by switching off the memory subsystem having a lowest rank of the active ones of the memory subsystems.

13. The information server of claim 1, wherein the power manager performs the power adaptation by switching on the memory subsystem having a highest rank of the inactive ones of the memory subsystems.

14. A method for power-aware adaptation in an information server, comprising the steps of:

determining which of a set of memory subsystems in the information server is to cache a set of data associated with an information access transaction;

performing a power adaptation in the information server in response to a set of ranks assigned to the memory subsystems.

15. The method of claim 14, wherein the step of determining includes the steps of determining a priority of the information access transaction and matching the priority to the ranks.

16. The method of claim 15, wherein the step of matching includes the step of selecting the memory subsystem having the rank that is a closest match to the priority.

17. The method of claim 15, wherein the step of determining the priority includes the step of examining the information access transaction.

18. The method of claim 15, wherein the step of determining the priority includes the step of extracting the priority from the information access transaction carried via a network.

19. The method of claim 15, wherein the step of determining the priority includes the step of determining the data targeted by the information access transaction.

20. The method of claim 15, wherein the step of determining the priority includes the step of determining an agreement with a client that generates the information transaction.

21. The method of claim 14, wherein the step of performing the power adaptation includes the step of triggering the power adaptation in response to a relatively high rate of power consumption in the information server.

22. The method of claim 14, wherein the step of performing the power adaptation includes the step of triggering the power adaptation in response to a relatively high level of heat.

23. The method of claim 14, wherein the step of performing the power adaptation includes the step of triggering the power adaptation in response to a relatively slow response time.

24. The method of claim 14, wherein the step of performing the power adaptation includes the step of triggering the power adaptation in response to a change in memory bandwidth contention.

25. The method of claim 14, wherein the step of performing the power adaptation includes the step of switching off the memory subsystem having a lowest rank of the active ones of the memory subsystems.

26. The method of claim 14, wherein the step of performing the power adaptation includes the step of switching on the memory subsystem having a highest rank of the inactive ones of the memory subsystems.

* * * * *